Patented May 9, 1933

1,907,882

UNITED STATES PATENT OFFICE

LEO SCHLECHT, OF LUDWIGSHAFEN-ON-THE-RHINE, GERMANY, ASSIGNOR TO I. G. FARBENINDUSTRIE AKTIENGESELLSCHAFT, OF FRANKFORT-ON-THE-MAIN, GERMANY, A CORPORATION OF GERMANY

PRODUCTION OF ACETONE FROM ACETYLENE

No Drawing. Application filed September 8, 1928, Serial No. 304,834, and in Germany October 21, 1927.

The present invention relates to the production of acetone.

On passing mixtures of acetylene and steam over catalysts the products hitherto obtained usually consist of acetaldehyde, small quantities of acetic acid and rather low amounts of acetone.

I have now found that when working under similar conditions, acetone is obtained as the main product in a very good yield when the time of contact of the mixture of acetylene and steam with the catalyst is kept longer than that at which the same catalyst furnishes acetaldehyde as the main product. In this process it is advantageous to employ as catalysts such substances as comprise such metals, or their compounds, the acetates of which decompose on heating.

It has been found that when the period of contact between the acetylene steam mixture and the specified catalysts is short, acetaldehyde is almost exclusively formed, and that the amount of acetone formed increases, and that of acetaldehyde diminishes, the longer the mixture is in contact with the catalyst, though from the processes already known it was to be expected that the formation of by-products would considerably overrule the formation of acetone. Thus for example, on employing a certain catalyst, say zinc oxid at an hourly rate of flow of 30 litres of acetylene per each litre of the catalyst, a yield of 55 per cent only is obtained which can be increased to 68 per cent by reducing the speed of passing the gasses to about half of the aforesaid rate of flow.

For example, good yields of acetone can be obtained with catalysts comprising oxids, carbonates or acetates of the alkaline earth metals, or of zinc, tin, aluminium, magnesium or other metals of the above mentioned kind, or basic salts of such metals, or any compounds of such metals as become converted into oxids, carbonates, acetates or basic salts during the reaction. Under certain circumstances, metals themselves may also be employed with advantage, as for example lead or iron in a finely divided state. Natural substances such as calamine, bauxite, and the like, may also be used, and mixtures of these substances with one another or with compounds which favor the formation of acetic acid from acetylene, such as vanadium pentoxid, manganese dioxid, chromium-thallium compounds and the like, are also suitable. For the sake of brevity, the said catalysts will be referred to in the following and in the claims as metallic catalysts. A catalyst which has become sluggish can easily be regenerated by treatment with air or oxygen, preferably in the presence of water vapor.

The most favorable temperature for the reaction depends on the nature and superficial area of the catalyst used, and especially on its capacity for accelerating the intermediate formation of acetic acid from acetylene. Generally speaking this temperature is between 400° and 450° C., but even at lower temperatures such as about 350° or up to about 500° C. rather satisfying results are obtained. The higher the working temperature, the greater should be the amount of water vapor employed in proportion to the acetylene, and also hereby the formation of undesired higher condensation products, such as benzene, naphthalene, phenol and the like, can be almost entirely avoided.

The formation of acetone can be further assisted by the addition of air or oxygen to the mixture of acetylene and steam. Pure acetylene may also be replaced by gaseous mixtures containing acetylene, but care must always be taken to provide the gasous mixture used being as free as possible from catalyst poisons, such as compounds of phosphorus or arsenic. Moreover, it has been found of advantage to preheat the reaction mixture, since this treatment obviates any injurious superheating of the catalyst, such as may readily occur, and give rise to the formation of tar and decomposition of acetylene, if the catalyst be heated from outside.

From the reaction mixture, which contains carbon dioxid and hydrogen, in addition to the acetone and steam, pure acetone can be recovered with the aid of a column still or dephlegmator placed immediately in rear of the reaction chamber.

The following examples will further illustrate the nature of the said invention which however is not limited thereto.

*Example 1*

A mixture of 1 part of acetylene and 3 parts of steam is raised to about 300° C. in a preheater, and is then passed over zinc oxid heated to about 450° C., the hourly rate of flow being about 30 litres of acetylene per each litre of the catalyst. On condensation, the effluent gas furnishes a condensate, free from aldehyde, containing 21 per cent of acetone in addition to the surplus water employed. The yield of acetone amounts to 68 per cent of the calculated amount.

*Example 2*

A mixture of 1 part of acetylene and 10 parts of water vapor is preheated to 350° C. and then passed over coarse pieces of iron oxid which has been prepared from iron nitrate by precipitation with ammonia and is heated to 400° C. At an hourly rate of flow of 17 litres of acetylene per each litre of the catalyst 30 per cent only of the acetylene employed is converted into acetone, which quantity is increased to 66.9 per cent by working at a rate of flow of only about 8.5 litres.

What I claim is:—

1. In the catalytic production of acetone by passing acetylene at a temperature above 300° C. together with water vapor over an anhydrous metallic catalyst the acetate of the metal of which decomposes at the temperature employed the step which comprises passing the said gaseous mixture over the said catalyst at a velocity of up to 30 liters of acetylene per hour and per liter of the said catalyst.

2. In the catalytic production of acetone by passing acetylene at a temperature above 300° C. together with water vapor over an anhydrous metallic catalyst comprising a metal compound the acetate of the metal of which decomposes at the temperatures employed, the step which comprises passing the said gaseous mixture together with oxygen over the said catalyst at a velocity of up to 30 liters of acetylene per hour and per liter of the said catalyst.

3. In the catalytic production of acetone by passing acetylene at a temperature above 300° C. together with water vapor over an anhydrous metallic catalyst comprising metal compounds the acetates of the metals of which decompose at the temperatures employed, the step which comprises passing the said gaseous mixture over the said catalyst at a velocity of up to 30 liters of acetylene per hour and per liter of the said catalyst.

4. In the catalytic production of acetone by passing acetylene at a temperature above 300° C. together with water vapor over a metallic catalyst comprising an anhydrous metal oxide the acetate of the metal of which decomposes at the temperature employed, the step which comprises passing the said gaseous mixture over the said catalyst at a velocity of up to 30 liters of acetylene per hour and per liter of the catalyst.

5. In the catalytic production of acetone by passing acetylene at a temperature above 300° C. together with water vapor over a catalyst, the step which comprises passing the said gaseous mixture over a catalyst comprising zinc oxide at a velocity of up to 30 liters of acetylene per hour and per liter of the said catalyst.

6. In the catalytic production of acetone by passing acetylene at a temperature between 400° and 450° C. together with water vapor over a catalyst, the step which comprises passing the said mixture over zinc oxide at a velocity of up to 30 liters of acetylene per hour and per liter of the said catalyst.

7. In the catalytic production of acetone by passing acetylene at a temperature between 300° and 500° C. together with water vapor over a metallic catalyst capable of being converted into the metal oxide during the reaction, the step which comprises carrying out the reaction at a velocity of from about 17 to about 30 liters of acetylene per hour and per liter of the said catalyst.

8. In the catalytic production of acetone by passing a mixture of acetylene with from about 3 to about 10 times its quantity of water vapor at a temperature between 300° and 500° C. together with the water vapor over a catalyst comprising metal compounds, the acetates of the metals of which decompose at the said temperatures, the step which comprises carrying out the reaction at a velocity of from about 17 to about 30 liters of acetylene per hour and per liter of the said catalyst.

9. In the catalytic production of acetone from a mixture of acetylene with a preponderating quantity of water vapor at a temperature between about 400° and 450° C., the step which comprises passing the said mixture over a catalyst comprising a compound of zinc, convertible into zinc oxide under the said conditions, at a velocity of from about 17 to about 30 liters of acetylene per hour and per liter of the said catalyst.

10. In the catalytic production of acetone from acetylene, the step which comprises passing a mixture of acetylene and a preponderating quantity of water vapor over zinc oxide at about 450° C. at a velocity of about 30 liters of acetylene per hour and per liter of the said catalyst.

In testimony whereof I have hereunto set my hand.

LEO SCHLECHT.